(12) United States Patent
Sakamoto et al.

(10) Patent No.: US 8,818,191 B2
(45) Date of Patent: Aug. 26, 2014

(54) WAVELENGTH REALLOCATION METHOD AND NODE DEVICE

(75) Inventors: Takeshi Sakamoto, Kawasaki (JP); Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 13/436,759

(22) Filed: Mar. 30, 2012

(65) Prior Publication Data
US 2012/0301141 A1    Nov. 29, 2012

(30) Foreign Application Priority Data

May 25, 2011    (JP) ................................. 2011-117287

(51) Int. Cl.
*H04J 14/00*    (2006.01)
*H04J 14/02*    (2006.01)

(52) U.S. Cl.
CPC ......... *H04J 14/0204* (2013.01); *H04J 14/0275* (2013.01); *H04J 14/0212* (2013.01); *H04J 14/0271* (2013.01)
USPC .................. 398/48; 398/49; 398/50; 398/58; 398/79; 398/82; 398/95; 398/173; 398/196

(58) Field of Classification Search
USPC ............................. 398/43–103, 173–181, 196
See application file for complete search history.

(56) References Cited

U.S. PATENT DOCUMENTS

| | | | |
|---|---|---|---|
| 5,438,445 A * | 8/1995 | Nakano ............................ | 398/83 |
| 5,602,666 A | 2/1997 | Ishikawa et al. | |
| 5,612,807 A | 3/1997 | Ishikawa et al. | |
| 5,636,046 A | 6/1997 | Ishikawa et al. | |
| 5,696,614 A | 12/1997 | Ishikawa et al. | |
| 6,072,610 A * | 6/2000 | Kuroyanagi et al. ............. | 398/5 |
| 6,081,359 A * | 6/2000 | Takehana et al. ................. | 398/1 |
| 6,243,176 B1 | 6/2001 | Ishikawa et al. | |
| 6,252,687 B1 | 6/2001 | Ishikawa et al. | |
| 6,252,688 B1 | 6/2001 | Ishikawa et al. | |
| 6,275,314 B1 | 8/2001 | Ishikawa et al. | |
| 6,384,943 B2 | 5/2002 | Ishikawa et al. | |
| 6,417,945 B2 | 7/2002 | Ishikawa et al. | |
| 6,930,824 B1 | 8/2005 | Ishikawa et al. | |
| 7,317,875 B2 * | 1/2008 | Moriwaki et al. .............. | 398/87 |
| 7,430,346 B2 * | 9/2008 | Jennen ............................ | 385/17 |
| 7,450,844 B2 * | 11/2008 | Nabeyama et al. ............... | 398/7 |
| 2004/0131366 A1 * | 7/2004 | Tsushima et al. ............. | 398/197 |
| 2004/0190903 A1 | 9/2004 | Miura et al. | |
| 2005/0249452 A1 | 11/2005 | Maruyama et al. | |
| 2006/0127093 A1 * | 6/2006 | Park et al. ........................ | 398/75 |
| 2008/0267627 A1 * | 10/2008 | Effenberger .................... | 398/72 |

(Continued)

FOREIGN PATENT DOCUMENTS

| | | | | |
|---|---|---|---|---|
| JP | 7-107069 | | 4/1995 | |
| JP | 11-068656 | * | 3/1999 | ............. H04B 10/02 |

(Continued)

*Primary Examiner* — Li Liu
(74) *Attorney, Agent, or Firm* — Fujitsu Patent Center

(57) ABSTRACT

A method for reallocating a wavelength in an optical wavelength multiplexer transmission system is disclosed. The method includes switching a supply of a first channel electric signal from a first optical transmitter device to a second optical transmitter device, the first optical transmitter device converting the first channel electric signal into an optical signal of a first wavelength, and the second optical transmitter device converting the first channel electric signal into an optical signal of a second wavelength differing from the first wavelength, and transmitting the optical signal of the second wavelength output from the second optical transmitter device.

7 Claims, 16 Drawing Sheets

(56) References Cited

U.S. PATENT DOCUMENTS

2009/0136230 A1* 5/2009 Bouda .............................. 398/51
2009/0169200 A1* 7/2009 Li et al. ............................ 398/7
2009/0226161 A1* 9/2009 Duan et al. ....................... 398/2
2012/0106966 A1* 5/2012 Skoog et al. ..................... 398/79

FOREIGN PATENT DOCUMENTS

| JP | 2004-179836 | 6/2004 |
| JP | 2009-033543 | 2/2009 |
| WO | WO-2004-102266 | 11/2004 |

* cited by examiner

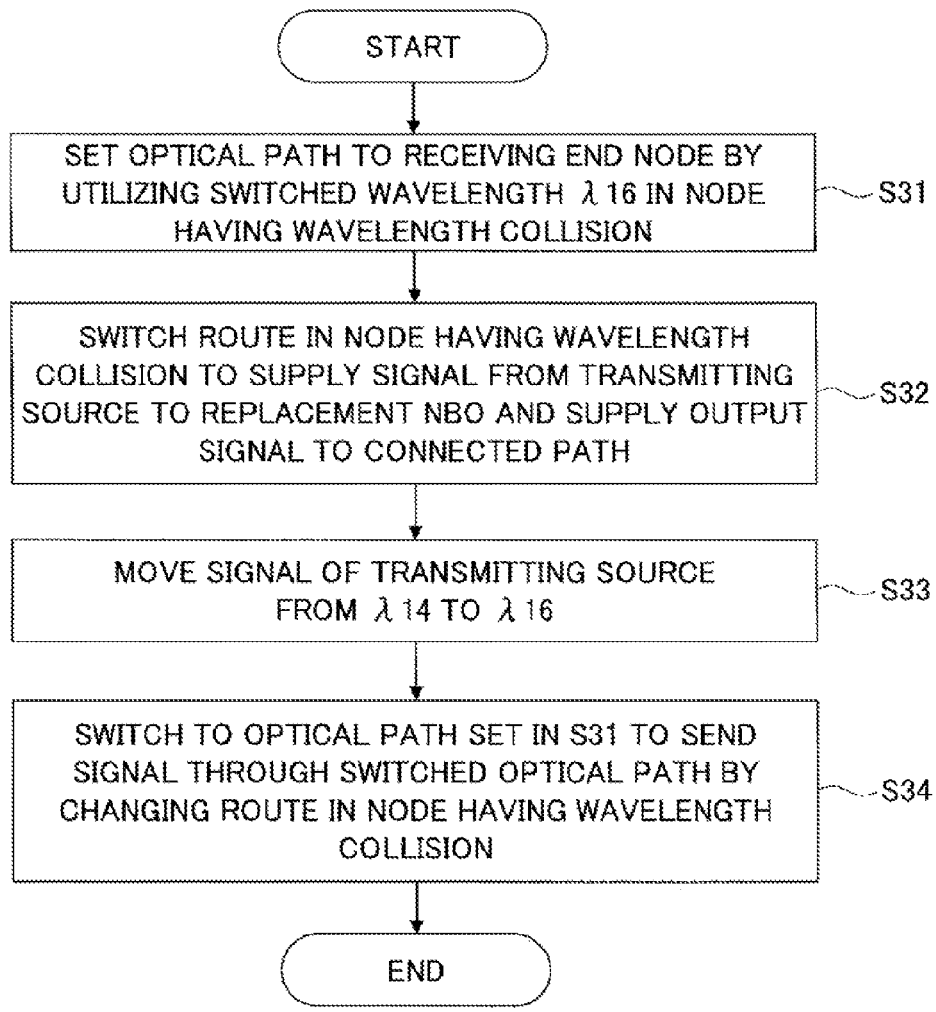

WAVELENGTH REALLOCATION METHOD AND NODE DEVICE

CROSS-REFERENCE TO RELATED APPLICATION

This patent application is based upon, and claims the benefit of priority of Japanese Patent Application No. 2011-117287 filed on May 25, 2011, the entire contents of which are incorporated herein by reference.

FIELD

The embodiments discussed herein are related to a wavelength reallocation method in an optical wavelength multiplexer transmission system and a node device.

BACKGROUND

In an optical wavelength multiplexer transmission system, there are growing technologies in increasing bit rates of multiplexed optical signals and growing diversity of signal modulation. In order to support such increased bit rates and construct a more flexible network system, there is proposed a network system that incorporates a technology called "liquid crystal on silicon" (LCOS), which is capable of varying a transmission bandwidth of a wavelength. The LCOS technology is capable of varying a transmission bandwidth of a wavelength multiplexer-demultiplexer device based on a bit rate of an optical signal. Hence, a more flexible network system optimized for the bit rates and modulation systems may be proposed by incorporating the LCOS technology.

Meanwhile, in the wavelength division multiplexer (WDM) transmission, there is disclosed a technology of setting different values for bandwidths according to wavelength dependency of four-wave mixed light as the number of wavelengths consecutively allocated on wavelength grids and allocating a guard band to at least one wavelength grid between the consecutively allocated wavelength groups without allocating a signal light to the wavelength grid (e.g., Patent Document 1).

Further, in the WDM transmission utilizing a wavelength close to a zero dispersion wavelength lambda$_0$ of an optical fiber, there is disclosed a technology of setting guard bands with predetermined power for reducing four light wave mixing including a zero dispersion wavelength lambda$_0$ and allocating optical signals of plural channels to be multiplexed outside the guard bands (e.g., Patent Document 2).

Moreover, there is disclosed an optical switch to perform switching by selecting wavelengths of optical WDM signals. The optical switch includes a diffraction grating optical waveguide part and an optical switch processing unit for 2×2 unit to mutually switch between wavelengths (e.g., Patent Document 3).

In addition, there is disclosed a technology in which plural optical cross-connect devices are allocated based on outgoing path units. The optical cross-connect device includes a first WSS configured to output optical WDM input signals in N paths, a second WSS configured to store on an output side wavelength multiplexed signals received from the N paths and selectively outputs based on the wavelength received from the first WSS, a wavelength converting unit configured to convert the multiplexed signal received from the second WSS into a predetermined wavelength, and an AWG configured to multiplex W wavelengths input from the wavelength converting unit (e.g., Patent Document 4).

RELATED ART DOCUMENT

Patent Document 1: Japanese Laid-open Patent Publication No. 2004-179836
Patent Document 2: Japanese Laid-open Patent Publication No. 7-107069
Patent Document 3: WO/2004/102266
Patent Document 4: Japanese Laid-open Patent Publication No. 2009-33543

When optical signals utilizing different modulation systems or different bit rates are simultaneously present within the same transmission channel, signal transmission may be degraded due to cross-phase modulation (XPM) or the like where one wavelength of light may affect the phase of an adjacent wavelength of light. Such signal transmission degradation may severely affect transmission distances of the optical signals or the like. Hence, adverse effects such as increased cost for the entire network or limitations to the network construction may be imposed upon the wavelength division multiplexer transmission system.

For example, FIG. 1 illustrates a wavelength division multiplexer (WDM) system in which optical signals with bit rates of 10 Gbps, 40 Gbps and 100 Gbps are allocated to corresponding channels. In this WDM system, an optical signal with a lower bit rate of 10 Gbps is affected by optical signals with higher bitrates of 40 Gbps and 100 Gbps due to XPM. Thus, transmission of signals may be degraded in the WDM system of FIG. 1.

Further, in a gridless network incorporating a device capable of varying a transmission bandwidth of a wavelength such as LCOS, wavelength bandwidths allocated to channels vary with the corresponding bit rates of the optical signals passing through the channels, and thus, spaces between the wavelengths are no longer equal. Accordingly, the wavelength allocation may vary with bit rates or the modulation systems of the optical signals. In the gridless network, when bit rates are continuously changed by reconfiguration of transmission paths or replacement of an optical transmitter-receiver device, there may be gaps formed between the allocated wavelengths as indicates by dashed ovals in FIG. 2.

Further, if a new channel that is to be added at the node N1, retained at the nodes N2 and N3, and then dropped at the node N4 in an optical wavelength multiplexer transmission system illustrated in FIG. 3, an optical signal bandwidth of the newly added channel may partially overlap an optical signal bandwidth of the existing channel between the nodes N2 and N3, and the nodes N3 and N4. Further, even if the optical signal bandwidths do not overlap each other, these channels may adversely be affected and may deteriorate due to the cross-phase modulation (XPM).

Thus, wavelength reallocation may need to be applied so as not to allow the bandwidth of the newly added channel to overlap the bandwidth of the existing channel and not to allow the channels to deteriorate. That is, the wavelength reallocation may require wavelength replacement. However, when a wavelength is replaced with another one, instantaneous interruption may occur and further, the duration may be long.

SUMMARY

According to an aspect of an embodiment, there is provided a method for reallocating a wavelength in an optical wavelength multiplexer transmission system. The method includes switching a supply of a first channel electric signal from a first optical transmitter device to a second optical transmitter device, the first optical transmitter device converting the first channel electric signal into an optical signal of a first wavelength, and the second optical transmitter device converting the first channel electric signal into an optical signal of a second wavelength differing from the first wavelength; and transmitting the optical signal of the second wavelength output from the second optical transmitter device.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

Additional objects and advantages of the embodiments will be set forth in part in the description which follows, and in part will be obvious from the description, or may be learned by practice of the invention.

BRIEF DESCRIPTION OF THE DRAWINGS

FIG. 16 is a flowchart illustrating a wavelength reallocation process according to another embodiment.

DESCRIPTION OF EMBODIMENTS

In the following, a description is given, with reference to the accompanying drawings, of the embodiments.

[Optical Wavelength Multiplexer Transmission System]

Figure 1:
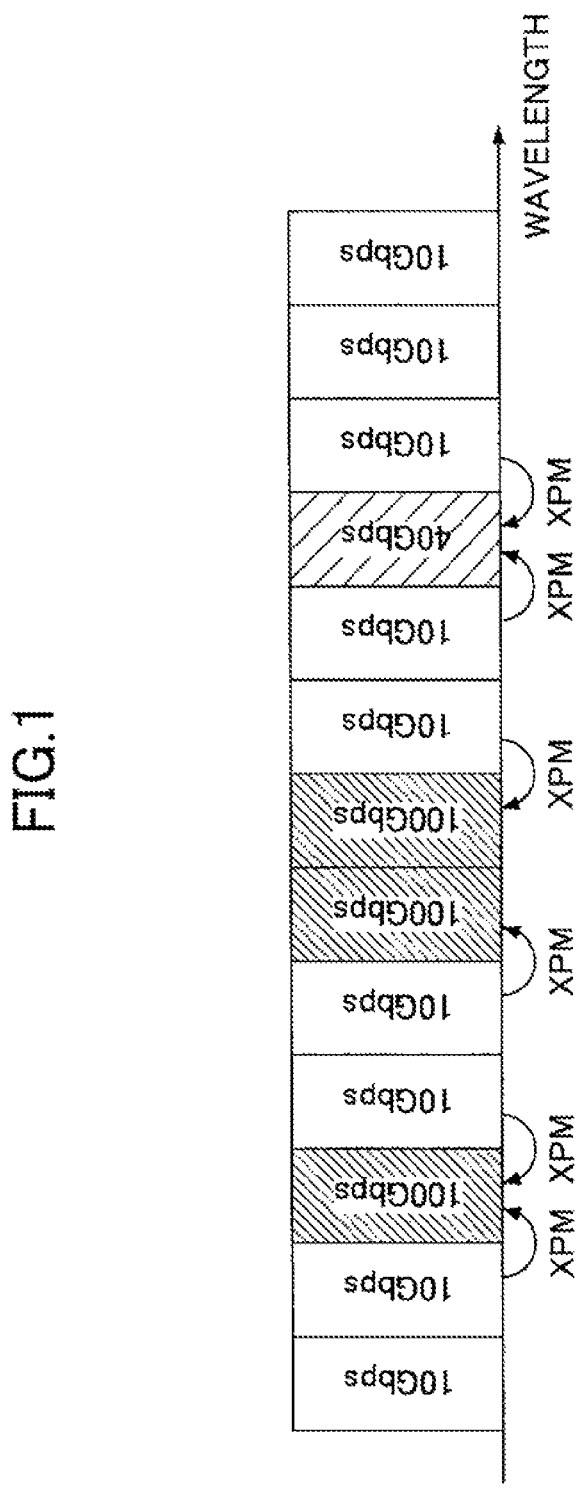
FIG. 1 is a diagram illustrating wavelength allocation in a wavelength division multiplexer (WDM) system.
Figure 2:
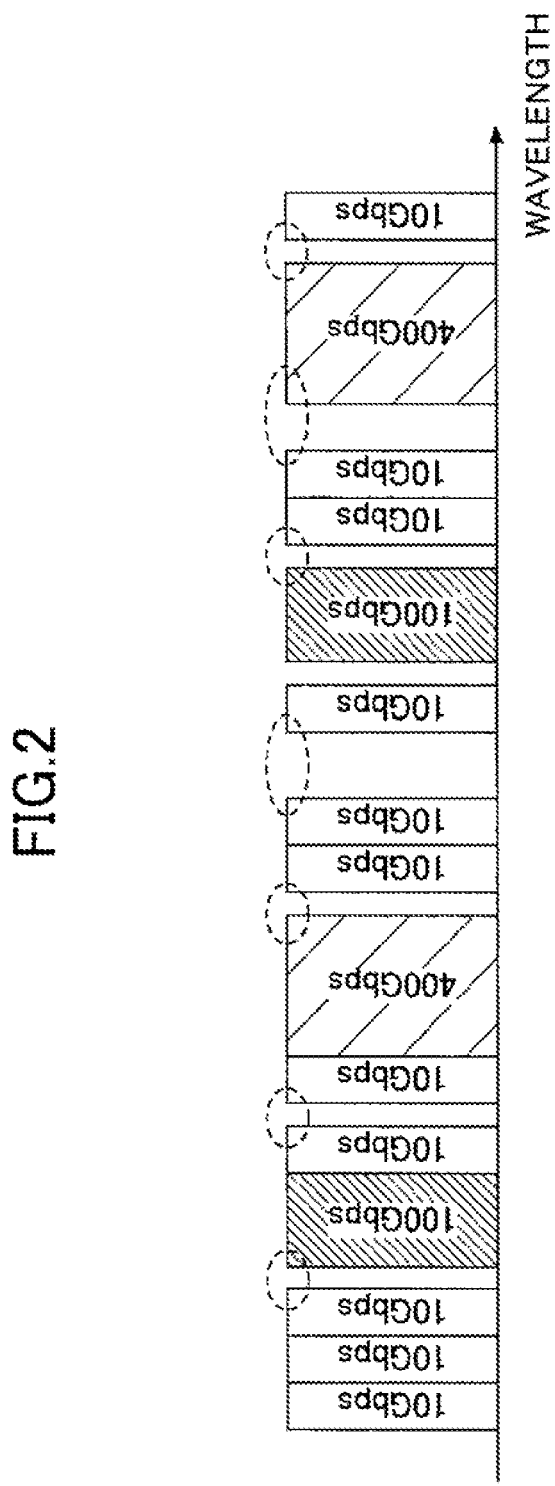
FIG. 2 is a diagram illustrating wavelength allocation in the wavelength division multiplexer (WDM) system.
Figure 3:
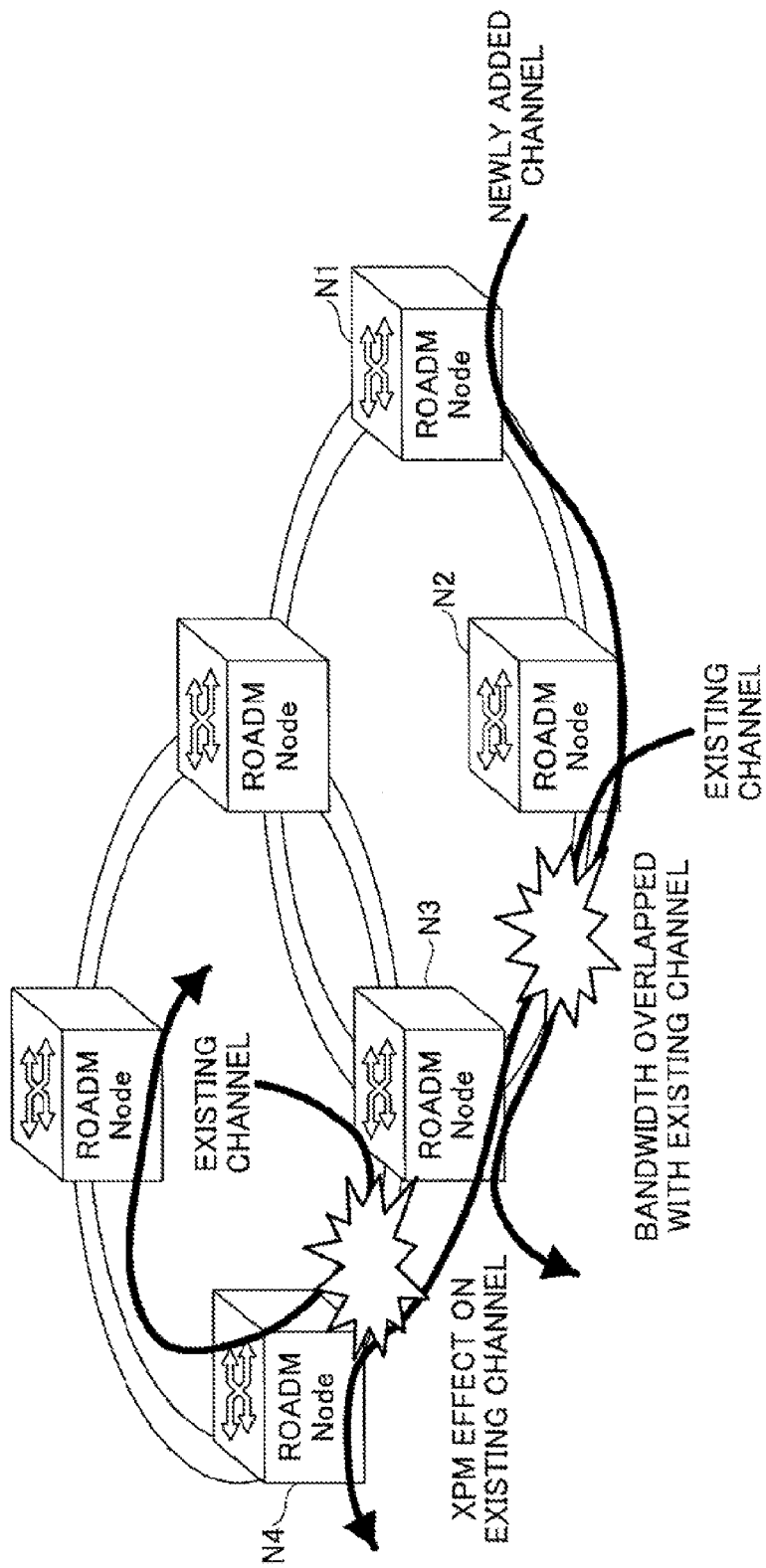
FIG. 3 is a configuration diagram illustrating an example of an optical wavelength multiplexer transmission system.
Figure 4:
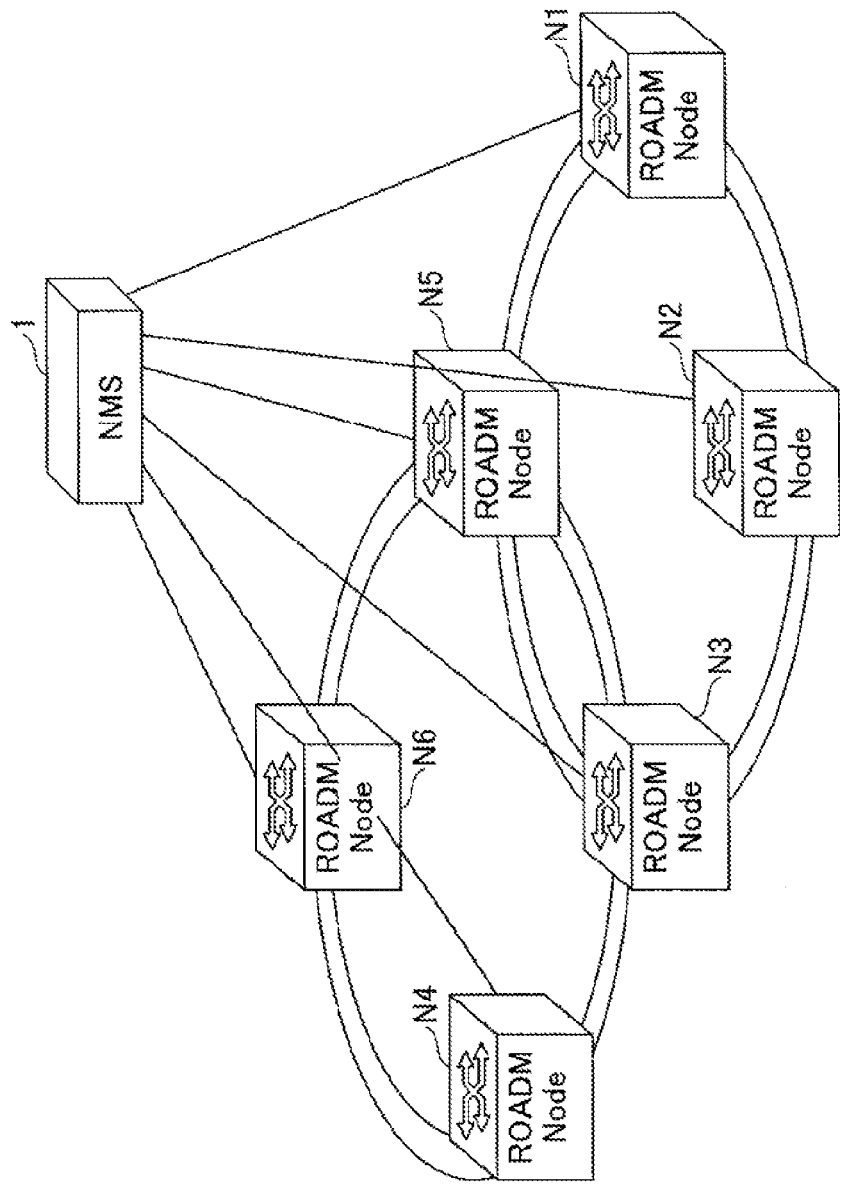
FIG. 4 is a configuration diagram illustrating an optical wavelength multiplexer transmission system according to an embodiment.

FIG. 4 is a configuration diagram of an optical wavelength multiplexer transmission system according to an embodiment. As illustrated in FIG. 4, a network is constructed by connecting an optical fiber between nodes N1, N2, N3, and N5 and also between nodes N3, N4, N6, and N5. Each of the nodes N1 to N6 is formed of a reconfigurable optical add/drop multiplexer (ROADM) that is capable of reconfiguring an optical wavelength and an optical path. Each of the nodes N1 to N6 is connected to a network management system (NMS) 1 configured to control monitoring of the entire network. Note that NMS1 may not necessarily be connected to each of the nodes N1 to N6. The NMS1 may only be connected to one of the nodes N1 to N6 (e.g., node N1). If the NMS1 is connected, for example, to the node N1, the NMS1 may be connected from the node N1 to other nodes N2 to N6 via the network.

[Node Device According to First Embodiment]

Figure 5:
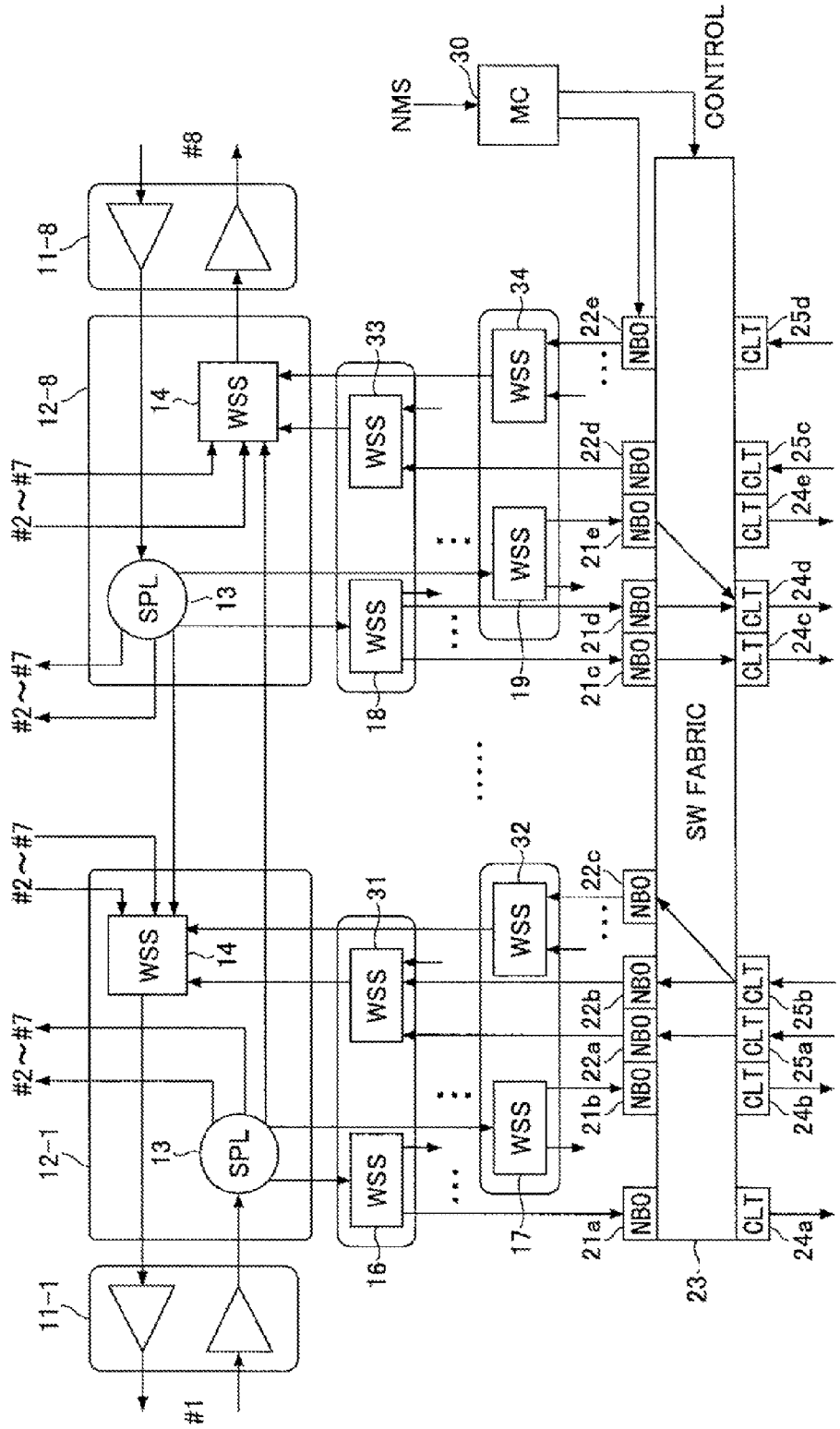
FIG. 5 is a configuration diagram illustrating a node device according to a first embodiment.

FIG. 5 is a configuration diagram illustrating a node device according to a first embodiment. The node device illustrated in FIG. 5 is a reconfigurable optical add/drop multiplexer (ROADM), which may be utilized as nodes N1 to N6. In FIG. 5, a wavelength division multiplexer (WDM) signal transmitted from a port #1 is received by an optical transmitter-receiver part 11-1, the received signal is power-split by a splitter (SPL) 13 of a demultiplexing part 12-1 corresponding to the port #1. The power-split optical signals are supplied to wavelength selective switches (WSS) 14 corresponding to ports #2 to #8, and also supplied to wavelength selective switches (WSS) 16 and 17. Similarly, an optical transmitter-receiver part 11-8 amplifies the WDM signal received from a port #8. The amplified WDM signal is power-split by a splitter (SPL) 13 of a demultiplexing part 12-8 corresponding to the port #8. The power-split signals are supplied to wavelength selective switches (WSS) 14 of the optical transmitter-receiver parts corresponding to ports #1 to #7. Simultaneously, the power-split optical signals are also supplied to receiving wavelength selective switches (WSS) 18 and 19.

The wavelength selective switches (WSS) 16 to 19 select respective wavelengths, and switch outgoing paths for the wavelengths to supply the corresponding optical signals to optical transmitter-receiver devices (or narrow band optics, NBO) 21a, 21b, 21c, 21d, and 21e. The optical transmitter-receiver devices (NBO) 21a to 21e are utilized as optical transmitter-receiver devices configured to convert an optical signal into an electric signal and supply the electric signal to a switched fabric 23.

The switched fabric 23 is connected with the optical transmitter-receiver devices (NBO) 21a to 21e, 22a to 22e and the like, and also with optical transmitter-receiver devices (CLT: Client unit) 24a to 24e and 25a to 25d. The switched fabric 23 supplies output signals transmitted from the optical transmitter-receiver devices (NBO) 21a to 21e to one of optical transmitter-receiver devices (CLT) 24a to 24d and NBO 22a to 22e.

The optical transmitter-receiver devices (CLT) 24a to 24d and optical transmitter-receiver devices 25a to 25d are wide band optics. The optical transmitter-receiver devices (CLT) 24a to 24d convert electric signals supplied from the switched fabric 23 into optical signals and supply the optical signals to the switched fabric 23. Likewise, the optical transmitter-receiver devices (CLT) 25a to 25d convert wide band optical signals supplied from a client into electric signals and supply the electric signals to the switched fabric 23. The switched fabric 23 supplies the electric signals received from the optical transmitter-receiver devices (CLT) 25a to 25d to the optical transmitter-receiver devices (NBO) 22a to 22e.

The optical transmitter-receiver devices (NBO) 22a to 22e are configured to convert electric signals from the switched fabric 23 into optical signals and supply the optical signals to receiving wavelength selective switches (WSS) 31, 32, 33 and 34. The optical signals having wavelengths multiplexed by the wavelength selective switches (WSS) 31 and 32 are supplied to the wavelength selective switch (WSS) 14 of demultiplexing part 12-1 and the multiplexed signals are multiplexed with the optical signals from the ports #2 to #8. Thereafter, the multiplexed signals are then transmitted from the port #1 by the optical transmitter-receiver part 11-1. The optical signals having wavelengths multiplexed by the wavelength selective switches (WSS) 33 and 34 are supplied to the wavelength selective switch (WSS) 14 of demultiplexing part 12-8 and the multiplexed signals are multiplexed with the optical signals from the ports #1 to #7. Thereafter, the multiplexed signals are then transmitted from the port #8 by the optical transmitter-receiver part 11-8.

Note that some of or all of the wavelength selective switches (WSS) 14, 16 to 19, and 31 to 34, and the optical transmitter-receiver devices (NBO) 21*a* to 21*e* and 22*a* to 22*e* utilize tunable devices such as liquic chrystal on silicon (LCOS) or tunable laser diodes (TLD). These tunable devices change (modulate) wavelengths of transmitting, receiving or oscillating optical signals based on the control of a management complex (MC) 30. As a result, a colorless function of the colorless, directionless and contentionless (CDC) function may be implemented. Further, a directionless function of the colorless, directionless and contentionless (CDC) function may be implemented by the switched fabric 23. Note that the "colorless" indicates capability of flexibly changing a wavelength of an output light, the "directionless" indicates capability of flexibly changing an outgoing path of the output light, and the "contentionless" indicates capability of preventing collision (interference) between wavelengths of the output light.

Note that an optical cross-connect switch (OXC) and a tunable filter (TF) serving as a tunable device for each wavelength may be utilized in place of the wavelength selective switches (WSS) 14, 16 to 16, and 31 to 34.

[Guard Band]

In order to implement advantageous utilization of the optical wavelength bands while suppressing the effect of the cross-phase modulation (XPM) between the optical signals as much as possible, optimal network wavelength utilization may need to be defined, and optical wavelengths or optical paths may need to be selected in compliance with such definitions. Further, when the optical wavelength is changed or the optical path is reconfigured after the network construction, the optical wavelength may be changed or the optical path may be reconfigured during in-service without adversely affecting existing optical signals and interrupting the service of the optical signals subjected to the wavelength change.

Figure 6:
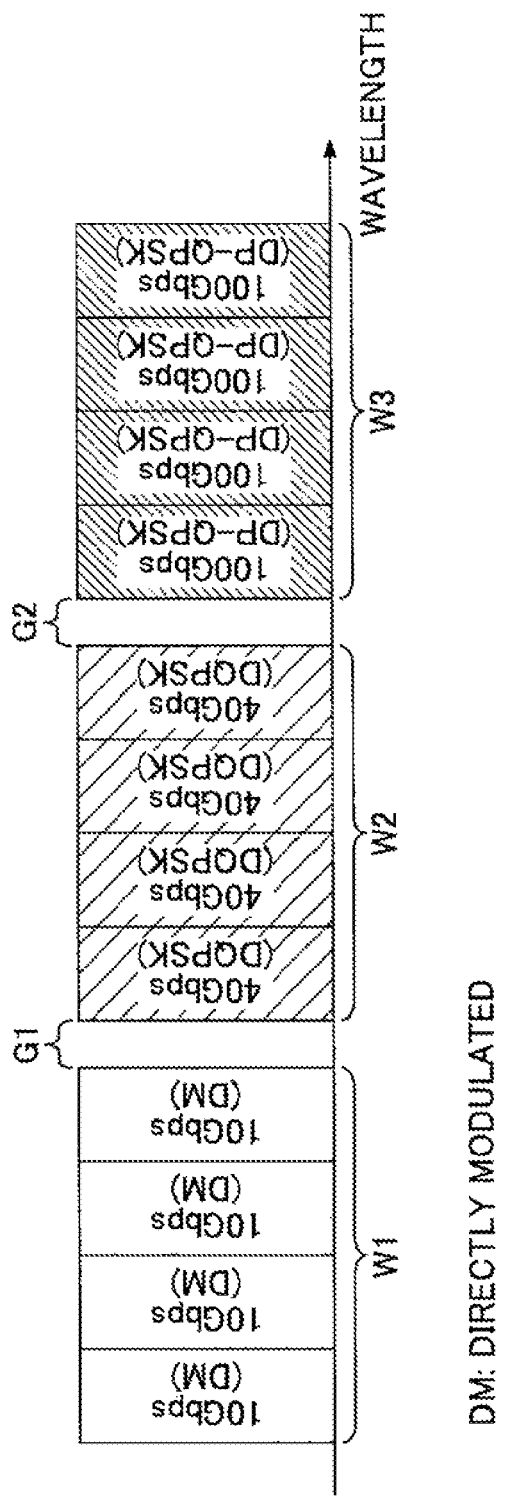
FIG. 6 is a diagram illustrating a guard band.

In this embodiment, as illustrated in FIG. 6, the wavelength bandwidth utilized for the WDM transmission may be specified for each of the bit rates or each of the modulation systems and a guard band is provided between the specified wavelengths so as not to allow the optical signals to be utilized in the gaps between the specified wavelengths. Accordingly, the effect of the cross-phase modulation (XPM) between the optical signals may be suppressed.

In FIG. 6, directly modulated wavelengths of plural optical signals having a bit rate of 10 Gbps are allocated to a first wavelength bandwidth W1. Differential quadrature phase shift keying (DQPSK) modulated wavelengths of plural optical signals having a bit rate of 40 Gbps are allocated to a second wavelength bandwidth W2. Further, dual polarization quadrature phase shift keying (DP-QPSK) modulated wavelengths of plural optical signals having a bit rate of 100 Gbps are allocated to a third wavelength bandwidth W3.

A guard band G1 is provided between the first wavelength bandwidth W1 and the second wavelength bandwidth W2 such that the optical signals of the second wavelength bandwidth W2 will not specifically be affected by the cross-phase modulation (XPM) from the optical signals of the first wavelength bandwidth W1. Likewise, a guard band G2 is provided between the second wavelength bandwidth W2 and the third wavelength bandwidth W3 such that the optical signals of the third wavelength bandwidth W3 will not specifically be affected by the cross-phase modulation (XPM) from the optical signals of the second wavelength bandwidth W2.

[Wavelength Reallocation by Switched Fabric]

There may be a case where a wavelength may be changed for avoiding the cross-phase modulation (XPM) or for advantageously utilizing the wavelength bandwidth. In this case, in order to change a wavelength of an optical signal without causing instantaneous interruption, an unutilized optical transmitter-receiver device (NBO) for replacing the wavelength may be prepared, a switching wavelength is switched with an electrical signal by the switched fabric 23 to be migrated to the unutilized optical transmitter-receiver device (NBO) and a desired signal is allocated in place of the optical signal of the switched (migrated) wavelength.

Figure 7:
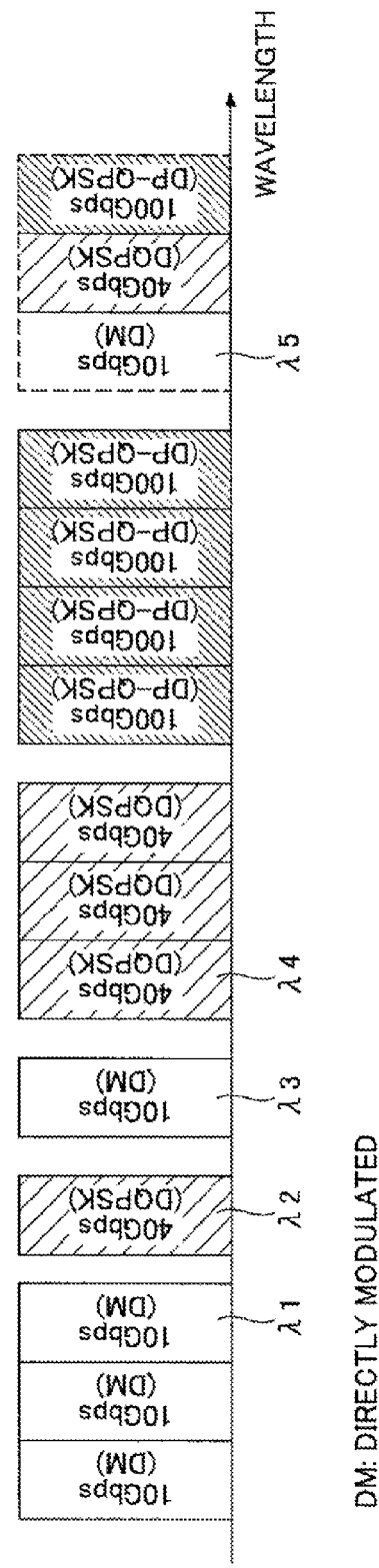
FIG. 7 is a diagram illustrating wavelength allocation in a wavelength division multiplexer (WDM) system.

FIG. 7 illustrates wavelength allocation in which a wavelength λ2 of a DQPSK modulated signal (CH2) with a bit rate of 40 Gbps is allocated adjacent to a wavelength λ1 of a directly modulated signal (CH1) with a bit rate of 10 Gbps, a wavelength λ3 of the directly modulated signal (CH3) with a bit rate of 10 Gbps is allocated adjacent to the wavelength λ2, and a wavelength λ4 of a DQPSK modulated signal (CH4) with a bit rate of 40 Gbps is allocated adjacent to the wavelength λ3. A subsequent description is given based on the assumption that the optical path is provided from the node N1 to the node N3 via the node N2 as illustrated in FIG. 4 with the above-described wavelength allocation.

Figure 8:
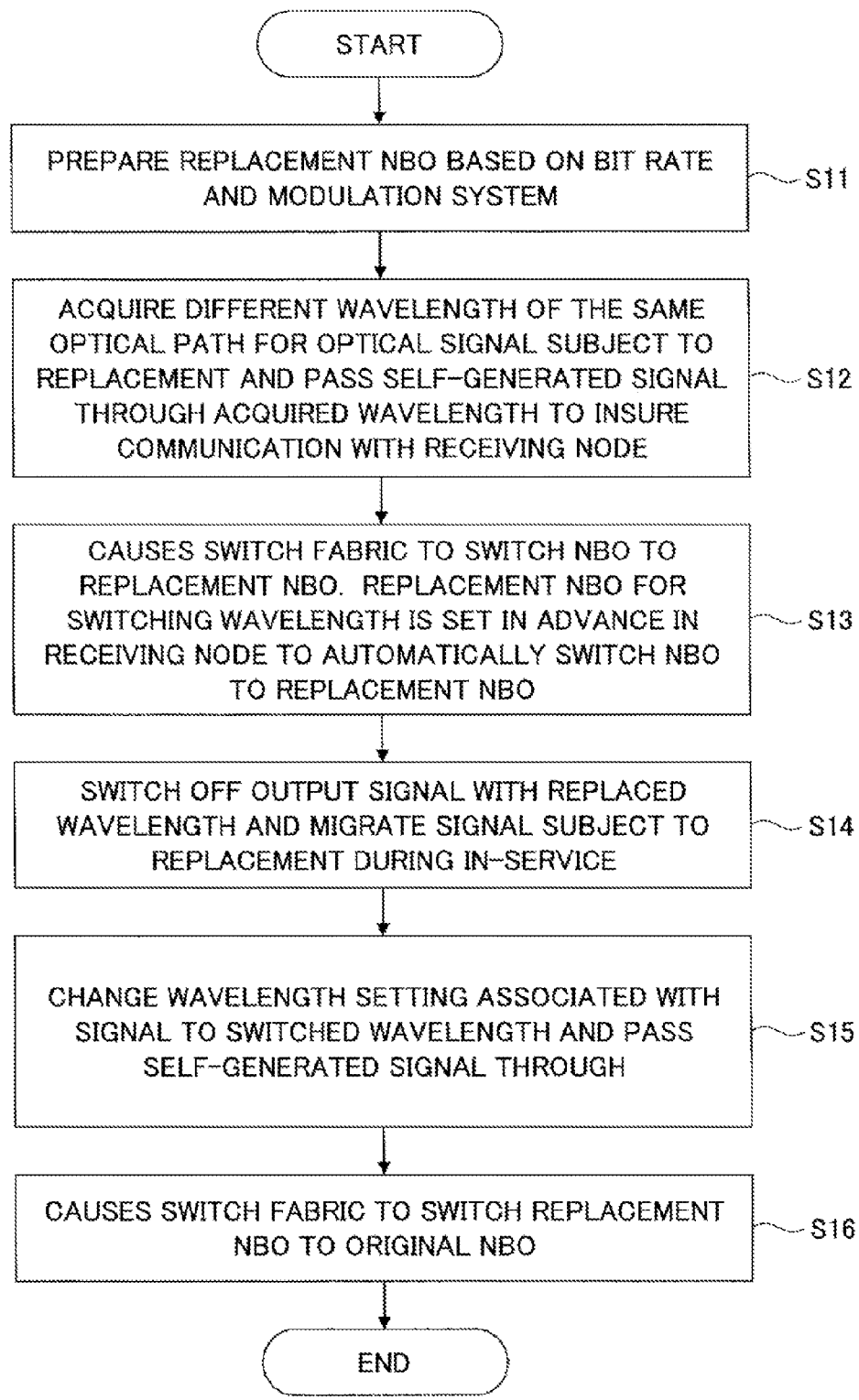
FIG. 8 is a flowchart illustrating a wavelength reallocation process according to an embodiment.

FIG. 8 is a flowchart illustrating a wavelength reallocation process according to an embodiment. As illustrated in FIG. 8, in step S11, a network management system (NMS) 1 allows each of a transmitting node and a receiving node to prepare an optical transmitter-receiver device (NBO) utilized for a replacement wavelength of an optical signal (hereinafter also called a "replacement NBO") based on the bit rate and the modulation system of the optical signal.

For example, in node N1, if a signal (CH3) transmitted from the optical transmitter-receiver device (CLT) 25*b* illustrated in FIG. 5 is received by the optical transmitter-receiver device (NBO) 22*b* and the received signal (CH3) is supplied to the wavelength selective switch (WSS) 31 as the optical signal of a wavelength λ3, the optical transmitter-receiver device (NBO) 22*c* is prepared as the replacement NBO for an optical signal of a wavelength λ5. Further, in node N3 illustrated in FIG. 5, if the optical transmitter-receiver device (NBO) 21*d* receives the signal (CH3) with the wavelength λ3 and supplies the received signal (CH3) to the optical transmitter-receiver device (CLT) 24*b*, the optical transmitter-receiver device (NBO) 21*e* is prepared as the replacement NBO for an optical signal of a wavelength λ5.

In step S12, the NMS1 acquires a different wavelength (e.g., λ5) of the same optical path for the wavelength λ3 subject to replacement, and passes a self-generated signal through the optical path for the wavelength λ5 to insure communications between the transmitting node N1 and the receiving node N3.

In step S13, an MC 30 of the transmitting node N1 causes the switched fabric 23 to perform switching instructions based on the instructions from the NMS 1 such that the signal (CH3) transmitted from the optical transmitter-receiver device (CLT) 25*b* is supplied to the replacement optical transmitter-receiver device (the replacement NBO) 22*c*. In the receiving node N3, incident light of the wavelength λ3 is configured to be automatically switched to incident light of the wavelength λ5 if the incident light of the wavelength λ3 is suddenly interrupted. That is, if the replacement optical transmitter-receiver (replacement NBO) 21*e* is configured in advance as a replacement NBO to switch wavelengths, the replacement optical transmitter-receiver (replacement NBO) 21e automatically switches the incident light of the wavelength λ3 to the incident light of the wavelength λ5 based on the switching instructions of the NMS 1 (or the switching instructions of an optical supervisory channel (OSC)). The wavelength λ3 of the signal (CH3) illustrated in FIG. 7 is switched to the wavelength of λ5 without causing instantaneous interruption in this manner.

Note that in the aforementioned example, the optical transmitter-receiver device (NBO) 22b is switched to the replacement optical transmitter-receiver device (the replacement NBO) 22c such that the signal (CH3) transmitted from the optical transmitter-receiver device (CLT) 25b is supplied to the replacement optical transmitter-receiver device (the replacement NBO) 22c based on the instructions from the NMS 1, and each of the optical transmitter-receiver devices (NBO) 22b and 22c includes a data buffer. Thus, when data D1 and D2 (not illustrated) successively output from the optical transmitter-receiver device (CLT) 25b are supplied to the data buffers of the optical transmitter-receiver devices (NBO) 22b and 22c, the data buffers of the optical transmitter-receiver devices (NBO) 22b and 22c store the received data D1 and D2, respectively. Thereafter, the optical transmitter-receiver device (NBO) 22b outputs the optical signal (with wavelength λ3) containing the data D1, and the optical transmitter-receiver device (NBO) 22c subsequently outputs the optical signal (with wavelength λ5) containing the data D2. Accordingly, it may be possible for the receiving node N1 to successively receive the data D1 and D2 while switching the wavelength λ3 to the wavelength λ5 without causing instantaneous interruption.

Next, in step S14, the MC 30 of the node N1 controls the optical signal having a wavelength λ3 switched by the wavelength selective switch (WSS) 31 based on the instructions from the NMS 1 such that the optical signal having the switched wavelength λ3 will not be output (i.e., the output of the optical signal the switched wavelength λ3 is switched off). The MC 30 then moves (converts) the wavelength λ2 of the signal (CH2) subject to replacement into the wavelength λ3 of the signal in FIG. 7 during in-service. A process for moving the wavelength λ2 to the wavelength λ3 is described later.

In step S15, the MC 30 of the transmitting node N1 changes the wavelength setting associated with the switched signal (CH3) of the optical transmitter-receiver device (NBO) 22b based on the instructions from the NMS 1 such that the switched wavelength λ3 of the signal (CH3) is changed to the wavelength λ2 illustrated in FIG. 7. Then, the communication with the receiving node is insured by passing through a self-generated signal.

In step S16, the MC 30 of the transmitting node N1 causes the switched fabric 23 to perform the switching instructions based on the instructions from the NMS 1 such that the signal from the optical transmitter-receiver device (CLT) 25b is supplied to the original optical transmitter-receiver device (NBO) 22b.

Accordingly, allocation of the wavelength λ3 of the directly modulated signal (CH3) with 10 Gbps is switched to the wavelength λ2, and allocation of the wavelength λ2 of the DQPSK modulated signal (CH2) with 40 Gbps is switched to the wavelength λ3 without causing instantaneous interruption.

Note that in the example of FIG. 7, one of the wavelength λ2 of the DQPSK modulated signal (CH2) with 40 Gbps and the wavelength λ3 of the directly modulated signal (CH3) with 10 Gbps is migrated to the replacement optical transmitter-receiver device (NBO). When selecting the replacement optical transmitter-receiver device (NBO), there are two alternatives of the high bit rate replacement NBO and the low bit rate replacement NBO. In this case, the MC 30 automatically selects the low bit rate replacement NBO by giving priority to the low bit rate signal (CH3). This is because the low bit rate signal may utilize a small amount of the buffer capacity in the replacement optical transmitter-receiver device (NBO).

[Modification of Wavelength Reallocation]

Figure 9:
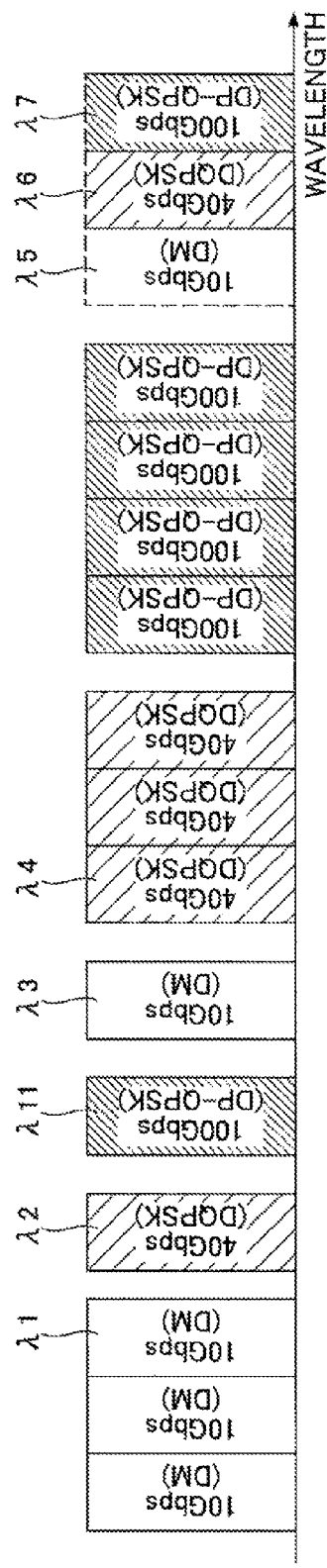
FIG. 9 is a diagram illustrating wavelength allocation in a wavelength division multiplexer (WDM) system.

FIG. 9 illustrates modification of wavelength (re)allocation. As illustrated in FIG. 9, a wavelength λ11 of the DP-QPSK modulated signal with 100 Gbps is reallocated between the wavelength λ2 subject to replacement of the DQPSK modulated signal (CH2) with 40 Gbps and the wavelength λ3 of the directly modulated signal (CH3) with 10 Gbps. A subsequent description is given provided that the optical path is provided from the node N1 to the node N3 via the node N2 as illustrated in FIG. 4 with the above-described wavelength allocation. In such a case, two replacement optical transmitter-receiver devices (NBO) are prepared.

Figure 10:
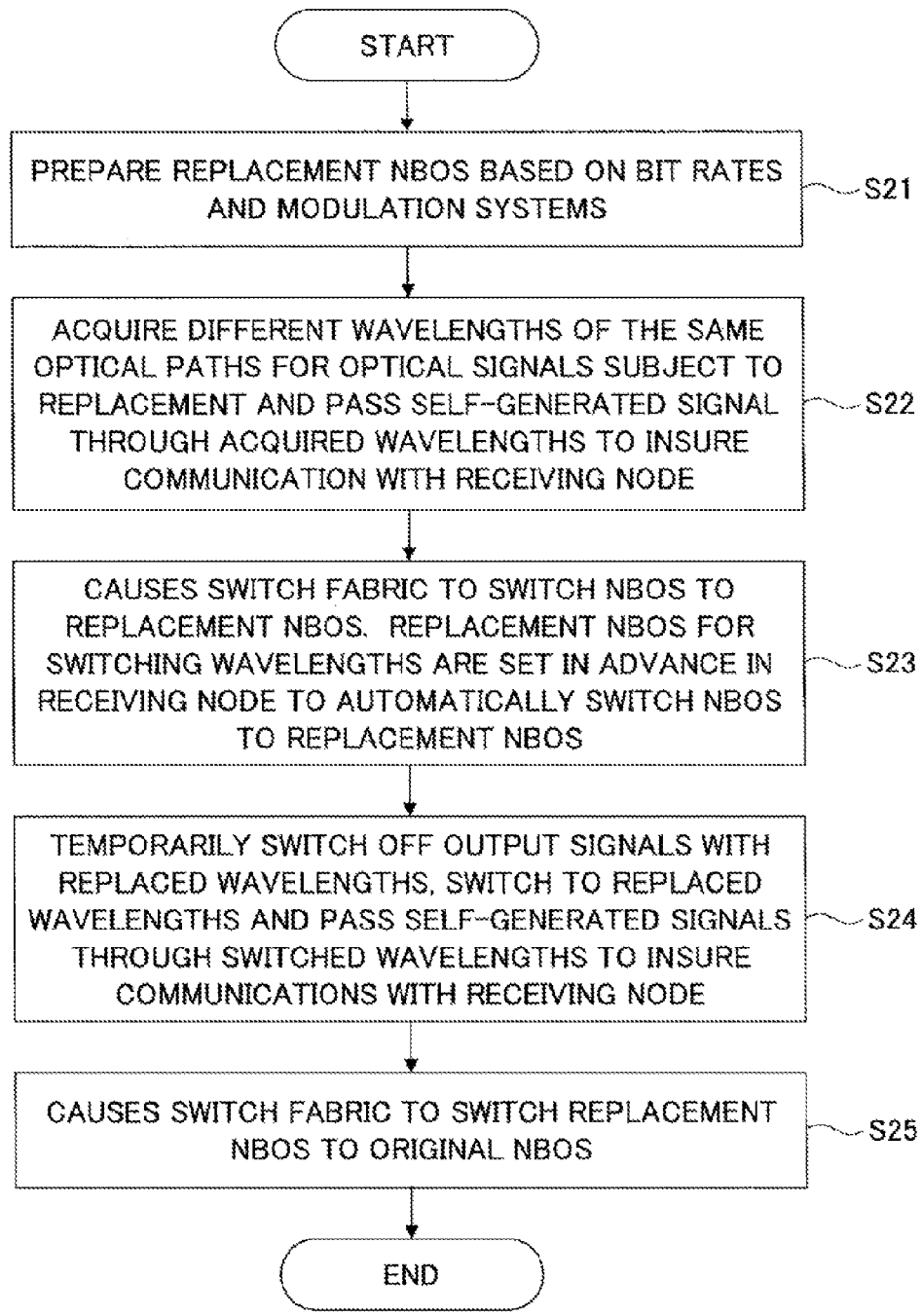
FIG. 10 is a flowchart illustrating modification of the wavelength reallocation process according to an embodiment.

FIG. 10 is a flowchart illustrating modification of the wavelength reallocation process according to the embodiment. As illustrated in FIG. 10, in step S21, a network management system (NMS) 1 allows each of a transmitting node and a receiving node to prepare an optical transmitter-receiver device (NBO) for a replacement wavelength of an optical signal (hereinafter also called a "replacement NBO") based on the bit rate and the modulation system of the optical signal.

In step S22, the NMS 1 acquires different wavelengths (e.g., λ6 and λ5) of the same optical paths for replacing the wavelengths λ2 and λ3, and passes a self-generated signal through the optical paths for the wavelengths λ6 and λ5 to insure communications between the transmitting node N1 and the receiving node N3.

In step S23, an MC 30 of the transmitting node N1 causes the switched fabric 23 to perform switching instructions based on the instructions from the NMS 1 such that the signal (CH3) transmitted from the optical transmitter-receiver device (CLT) 25b is supplied to the replacement optical transmitter-receiver device (the replacement NBO) 22c. Similarly, the signal (CH2) transmitted from the optical transmitter-receiver device (CLT) 25b is supplied to the replacement optical transmitter-receiver device (the replacement NBO). In the receiving node N3, two replacement optical transmitter-receiver devices (the replacement NBO) 21e and the like are prepared in advance for provisioning switching wavelengths so as to automatically switch the optical transmitter-receiver device (CLT) 25b to the two replacement optical transmitter-receiver devices (NBO) 21e. The wavelengths λ2 and λ3 of the signals (CH2 and CH3) illustrated in FIG. 9 may be switched to the wavelengths of λ6 and λ5 without causing instantaneous interruption in this manner.

Next, in step S24, the MC 30 of the node N1 controls the optical signals (λ2 and λ3) switched by the wavelength selective switch (WSS) 31 and the like based on the instructions from the NMS 1 such that the optical signals (λ2 and λ3) will not be output (output of the optical signals (λ2 and λ3) is switched off). In step S25, the MC 30 of the transmitting node N1 changes the wavelength setting associated with the switched signal (CH2) of the optical transmitter-receiver device (NBO) 22b and the like based on the instructions from the NMS 1 such that the wavelength setting of the signal (CH2) is changed to the wavelength λ3 illustrated in FIG. 9. Similarly, the MC 30 of the transmitting node N1 changes the wavelength setting associated with the switched signal (CH3) of the optical transmitter-receiver device (NBO) 22b and the like based on the instructions from the NMS 1 such that the wavelength setting of the signal (CH3) is changed to the wavelength λ2 illustrated in FIG. 9. Then, the communication with the receiving node is insured by passing through a self-generated signal.

In step S25, the MC 30 of the transmitting node N1 causes the switched fabric 23 to perform the switching instructions based on the instructions from the NMS 1 such that the signals from the optical transmitter-receiver device (CLT) 25b and the like are supplied to the original optical transmitter-receiver device (NBO) 22b and the like.

Accordingly, allocation of the wavelength λ3 of the directly modulated signal (CH3) with 10 Gbps is switched to the wavelength λ2, and allocation of the wavelength λ2 of the DQPSK modulated signal (CH2) with 40 Gbps is switched to the wavelength λ3 without causing instantaneous interruption.

Note that if the buffer of the switched fabric 23 has a sufficiently large capacity for performing switching with electric signals, the higher bit rate replacement optical transmitter-receiver device (NBO) may preferentially be selected. If an optical transmitter-receiver device (NBO) with a wavelength λ7 for 100 Gbps signal is available as an alternative for selecting the replacement NBO other than the optical transmitter-receiver device (NBO) with the wavelength λ5 for 10 Gbps signal and an optical transmitter-receiver device (NBO) with a wavelength λ6 for 40 Gbps signal, the optical transmitter-receiver device (NBO) with the wavelength λ7 for 100 Gbps is selected as the replacement optical transmitter-receiver device (NBO). Then, the wavelength λ2 of the DQPSK modulated signal (CH2) with 40 Gbps and the wavelength λ3 of the directly modulated signal (CH3) with 10 Gbps are supplied to the optical transmitter-receiver device (NBO) with the wavelength λ7 for 100 Gbps to convert the supplied DQPSK modulated signal (CH2) with the wavelength λ2 and the directly modulated signal (CH3) with the wavelength λ3 into the optical signals with the wavelength λ7.

In this case, plural NBOs may not necessarily be prepared and hence, the required bandwidth may be reduced. Note that a total wavelength bandwidth of the wavelength λ5 of the signal for 10 Gbps and the wavelength λ6 of the signal for 40 Gbps is smaller than a wavelength bandwidth of the wavelength λ7 of the signal for 100 Gbps.

When the DQPSK modulated signal (CH2) with 40 Gbps and the directly modulated signal (CH3) with 10 Gbps are transmitted via the wavelength λ7 for 100 Gbps signal, the bit rates of the DQPSK modulated signal (CH2) and the directly modulated signal (CH3) are increased to 100 Gbps. Thus, the transmission performance capable of being acquired with the bit rates of 40 Gbps and 10 Gbps may not be satisfied. This feature may result that the higher the bit rate, the shorter the transmission distance may be.

In such a case, the transmission performance of the signals (CH2 and CH3) may be improved by varying the bit rate of the NBO from 100 Gbps to 50 Gbps utilizing a bit rate variable function as an output of the NBO. Thus, the backup NBO or the wavelength bandwidth may be effectively utilized.

The aforementioned process according to the first embodiment may be an effective process for not only carrying out wavelength replacement in the network side, but also for performing wavelength reallocation by temporarily moving the signal in an unused port in order to perform more efficient multiplexing when the client side signal is combined with the network side signal. For example, assume that an example in which the 10 Gbps client signals are supplied from 10 channels to 10 optical transmitter-receiver device (CLT) 25a and the like, and the signals received by the 10 optical transmitter-receiver devices (CLT) 25a are supplied to 10 optical transmitter-receiver devices (NBO) 22a via the switched fabric 23, where the signals are transmitted in the same path with 10 wavelengths. In this case, the signals transmitted from the 10 optical transmitter-receiver devices (CLT) 25a and the like are supplied to one 100 Gbps signal NBO in the switched fabric 23 such that the received signals may be transmitted with the 100 Gpbs signal wavelength. In this case, a large number of NBOs may not necessarily be prepared and hence, the required bandwidth may be reduced.

[Node Device According to Second Embodiment]

Figure 11:
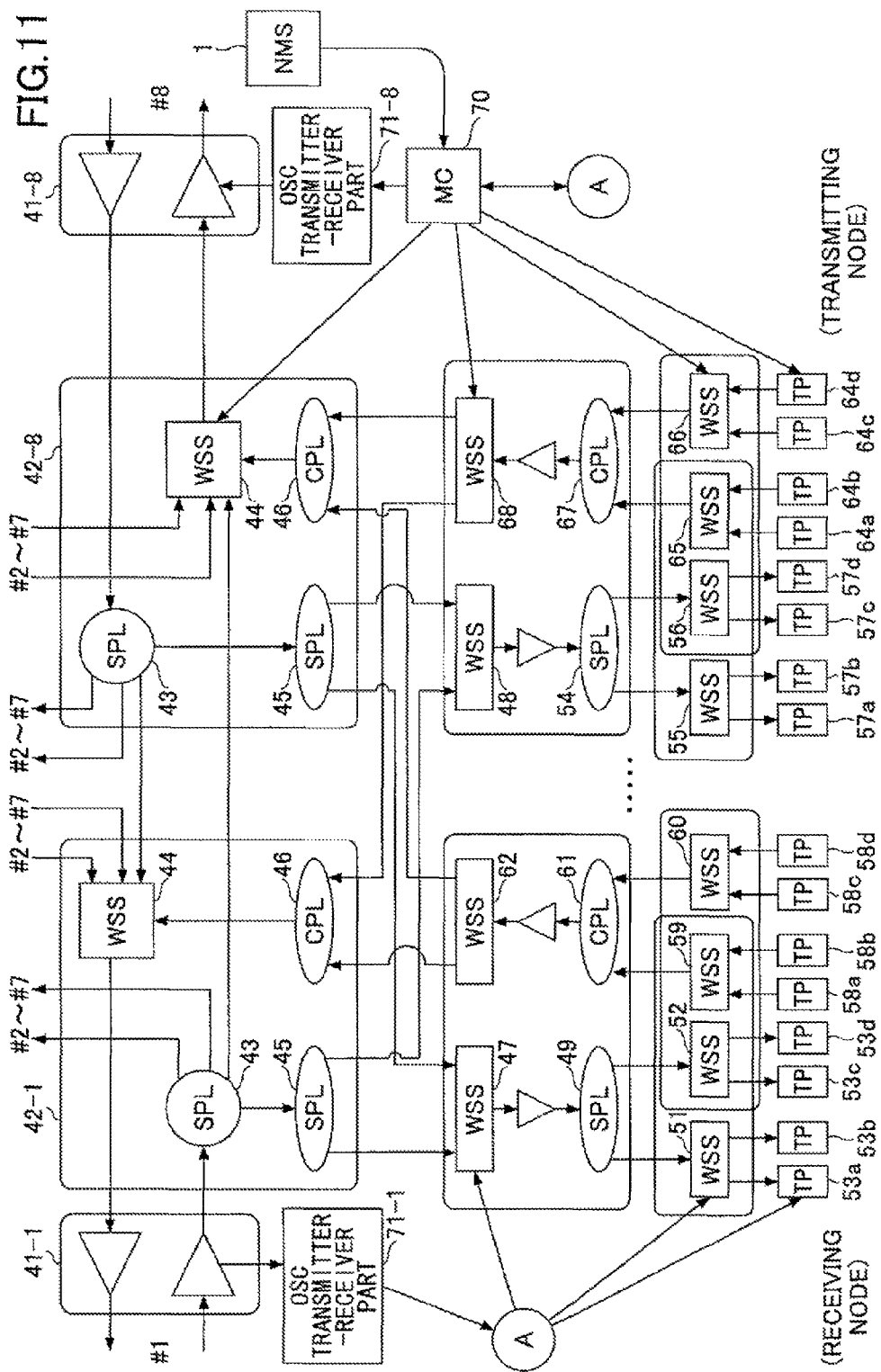
FIG. 11 is a configuration diagram illustrating a node device according to a second embodiment.

FIG. 11 is a configuration diagram illustrating a node device according to a second embodiment. The node device illustrated in FIG. 11 is a reconfigurable optical add/drop multiplexer (ROADM) supporting a settings following mode, which may be utilized as nodes N1 to N6. As illustrated in FIG. 11, an optical transmitter-receiver part 41-1 receives a wavelength division multiplexing (WDM) signal from a port #1. The WDM signal is power-split by a splitter (SPL) 43 of a demultiplexing part 42-1 corresponding to the port #1. The power-split WDM signal is supplied to a wavelength selective switch (WSS) 44 of the optical transmitter-receiver part 42-1 corresponding to ports #2 to #7 and is also supplied to a splitter (SPL) 45 of the demultiplexing part 42-1 to split power of the WDM signal. The power-split WDM signal is then supplied to receiving wavelength selective switches (WSS) 47 and 48.

likewise, an optical transmitter-receiver part 41-8 receives a wavelength division multiplexing (WDM) signal from a port #8. The WDM signal is power-split by a splitter (SPL) 43 of a demultiplexing part 42-8 corresponding to the port #8. The power-split WDM signal is supplied to a wavelength selective switch (WSS) 44 of the optical transmitter-receiver part 42-8 corresponding to ports #1 to #7 and is also supplied to a splitter (SPL) 45 of the demultiplexing part 42-8 to split power of the WDM signal. The power-split WDM signal is then supplied to the receiving wavelength selective switches (WSS) 47 and 48.

The WDM signal output by the wavelength selective switch (WSS) 47 is power-split by a splitter (SPL) 49 and the power-split WDM signal is supplied to wavelength selective switches (WSS) 51 and 52. The wavelength selective switches (WSS) 51 and 52 select respective wavelengths, and switch outgoing paths for the wavelengths to supply the corresponding optical signals to transponders (TP) 53a to 53d serving as optical transmitter-receiver devices. The transponders 53a to 53d convert the optical signals into electric signals and encapsulate the electric signals in frames. The transponders 53a to 53d convert the framed electric signals into wideband optical signals to send the converted wideband optical signals to the client.

Similarly, the WDM signal output by the wavelength selective switch (WSS) 48 is power-split by a splitter (SPL) 54 and the power-split WDM signal is supplied to wavelength selective switches (WSS) 55 and 56. The wavelength selective switches (WSS) 55 and 56 select respective wavelengths, and switch outgoing paths for the wavelengths to supply the corresponding optical signals to transponders (TP) 57a to 57d serving as optical transmitter-receiver devices. The transponders 57a to 57d convert the narrowband optical signals into electric signals and encapsulate the electric signals in frames. The transponders 57a to 57d convert the framed electric signals into wideband optical signals to send the wideband optical signals to the client.

The transponders (TP) 58a to 58d serve as the optical transmitter-receiver devices so that the transponders (TP) 58a to 58d convert the wideband optical signals received from the client into electric signals, and encapsulate the electric signals in frames. The transponders 58a to 58d further convert the framed electric signals into narrowband optical signals to supply the converted narrowband optical signals to wavelength selective switches (WSS) 59 and 60. The wavelength selective switches (WSS) 59 and 60 multiplex the optical signals with respective wavelengths and the optical signals output by the wavelength selective switches (WSS) 59 and 60 are supplied to a transmitting coupler (CPL) 61. The transmitting coupler (CPL) 61 then multiplexes the optical signals supplied from the wavelength selective switches (WSS) 59 and 60 and the multiplexed optical signals are supplied to a wavelength selective switches (WSS) 62. The wavelength selective switch (WSS) 62 selects respective wavelengths, and switch outgoing paths for the wavelengths to supply the corresponding optical signals to a coupler (CPL) 46 of each of the demultiplexing parts 42-1 to 42-8.

Likewise, the transponders (TP) 64a to 64d serve as the optical transmitter-receiver devices so that the transponders (TP) 64a to 64d convert the wideband optical signals received from the client into electric signals, and encapsulate the electric signals in frames. The transponders 64a to 64d further convert the framed electric signals into narrowband optical signals to supply the converted narrowband optical signals to wavelength selective switches (WSS) 65 and 66. The wavelength selective switches (WSS) 65 and 66 multiplex the optical signals with respective wavelengths and the optical signals output by the wavelength selective switches (WSS) 65 and 66 are supplied to a transmitting coupler (CPL) 67. The transmitting coupler (CPL) 67 then multiplexes the optical signals supplied from the wavelength selective switches (WSS) 59 and 60, and the multiplexed optical signals are supplied to a wavelength selective switches (WSS) 68. The wavelength selective switch (WSS) 68 selects respective wavelengths, and switch outgoing paths for the wavelengths to supply the corresponding optical signals to a coupler (CPL) 46 of each of the demultiplexing parts 42-1 to 42-8.

The optical signals multiplexed by the couplers (CPL) 46 of the demultiplexing parts 42-1 to 42-8 are supplied to the wavelength selective switches (WSS) 44 of the demultiplexing parts 42-1 to 42-8 and the multiplexed signals are multiplexed with the optical signals from the ports #1 to #8. Thereafter, the multiplexed signals are then transmitted from the ports #1 to #8 by the optical transmitter-receiver parts 41-1 to 41-8.

Note that tunable devices such as LCOS or TLD are utilized for all the wavelength selective switches (WSS) 44, 47, 48, 51, 52, 55, 56, 59, 60, 62, 65, 66 and 68, and the transponders (TP) 58a to 58d and 64a to 64d. Likewise, the tunable devices are utilized for local oscillation light generators inside coherent optical receivers of the transponders 53a to 53d, and 57a to 57d.

Note that an optical cross-connect switch (OXC) and a tunable filter (TF) serving as a tunable device for each wavelength may be utilized in place of the wavelength selective switches (WSS) 44, 47, 48, 51, 52, 55, 56, 59, 60, 62, 65, 66 and 68.

These tunable devices change wavelengths of transmitting, receiving or oscillating optical signals based on the control of the management complex (MC) 70. As a result, a colorless function of the colorless, directionless and contentionless (CDC) function may be implemented. Further, the optical signals output by the splitters (SPL) 45 of the respective demultiplexing parts are supplied to the receiving wavelength selective switches (WSS) 47 and 48 for selecting wavelengths. The optical signals having the wavelengths selected by the transmitting wavelength selective switches (WSS) 62 and 68 are supplied to the couplers (CPL) 46 of the respective demultiplexing parts. As a result, the directionless function of the CDC function may be implemented.

Note that the management complex (MC) 70 is provided with the control information of the optical signals performing wavelength switching or wavelengths of the switched optical signals specified by the NMS 1. The optical transmitter-receiver device 41-1 to 41-8 include respective optical supervisory channel (OSC) transmitter-receiver parts 71-1 to 71-8 configured to transmit or receive optical supervisory channel signals for transmitting or receiving monitoring control information from upstream and downstream of the network. If a downstream node is connected on the port #8 side and an upstream node is connected on the port #1 side in FIG. 11, the management complex (MC) 70 supplies the control information received from the NMS 1 to OSC transmitter-receiver part 71-8. The OSC transmitter-receiver part 71-8 then inserts the control information into the OSC signal and transmits the OSC signal containing the control information to the downstream node. Further, in the downstream node, the OSC transmitter-receiver part 71-1 extracts the control information from the OSC signal and supplies the extracted control information to the management complex (MC) 70.

[Modification]

Figure 12:
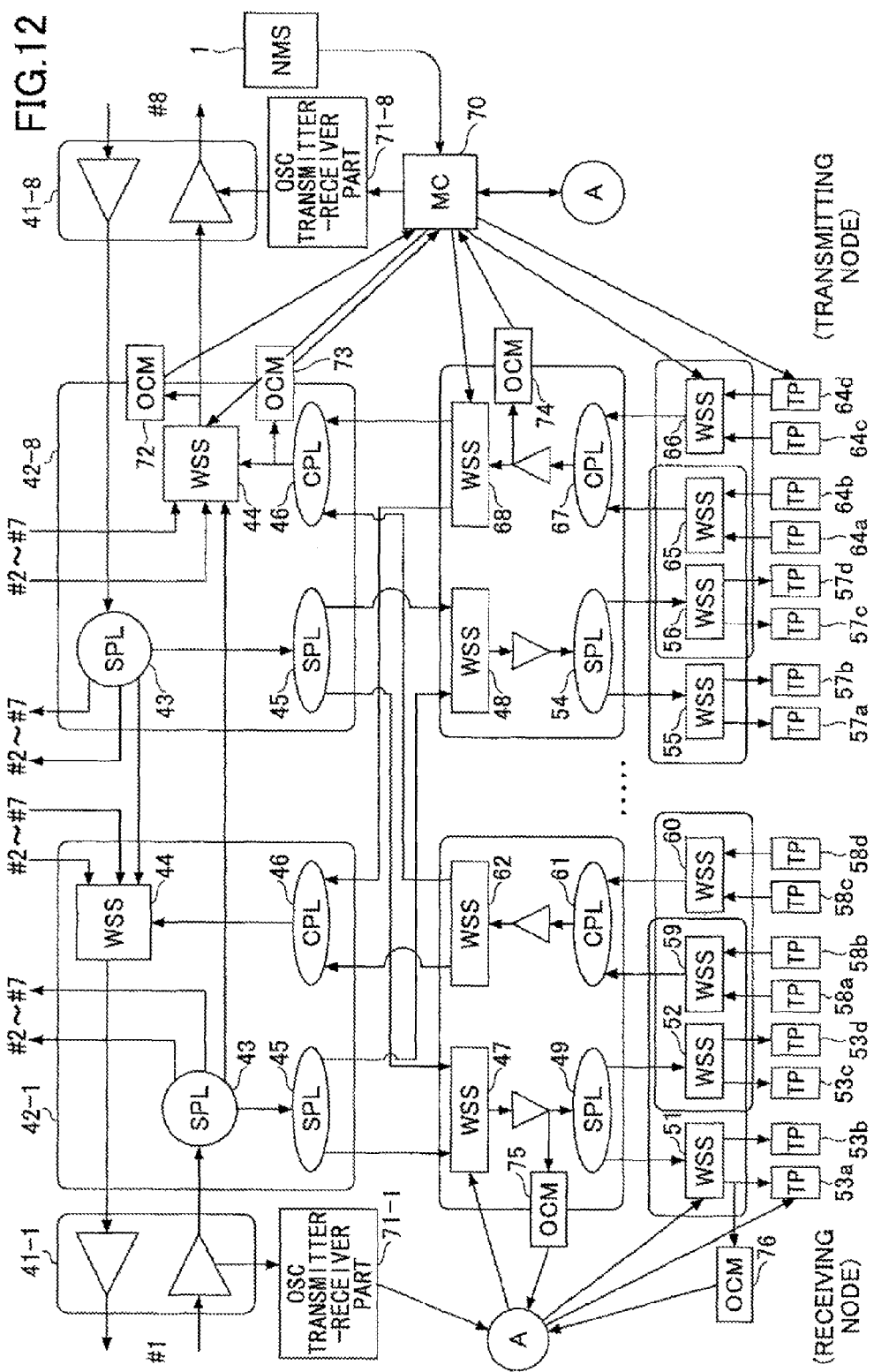
FIG. 12 is a configuration diagram illustrating modification of the node device according to the second embodiment.

FIG. 12 is a configuration diagram illustrating modification of the node device according to the second embodiment. The node device illustrated in FIG. 12 is a reconfigurable optical add/drop multiplexer (ROADM) supporting a settings following mode, which may be utilized as nodes N1 to N6. The configuration of the node in FIG. 12 differing from that of the node in FIG. 11 in that the node in FIG. 12 is provided with optical channel monitors (OCM) 72 to 76.

The OCM 72 is provided subsequent to the wavelength selective switch (WSS) 44. The OCMs 73 and 74 are subsequent to the respective couplers 46 and 67. The OCMs 75 and 76 are subsequent to the respective wavelength selective switches (WSS) 47 and 51. The central wavelengths of the optical signals measured by the OCMs 72 to 76 are supplied to the management complex (MC) 70.

Note that although not illustrated in FIG. 12, the OCM may be provided subsequent to each of the wavelength selective switch (WSS) 44, the coupler (CPL) 61, the wavelength selective switches (WSS) 52, 48, 55 and 56.

[Signal Wavelength Change During In-Service]

Figure 13:
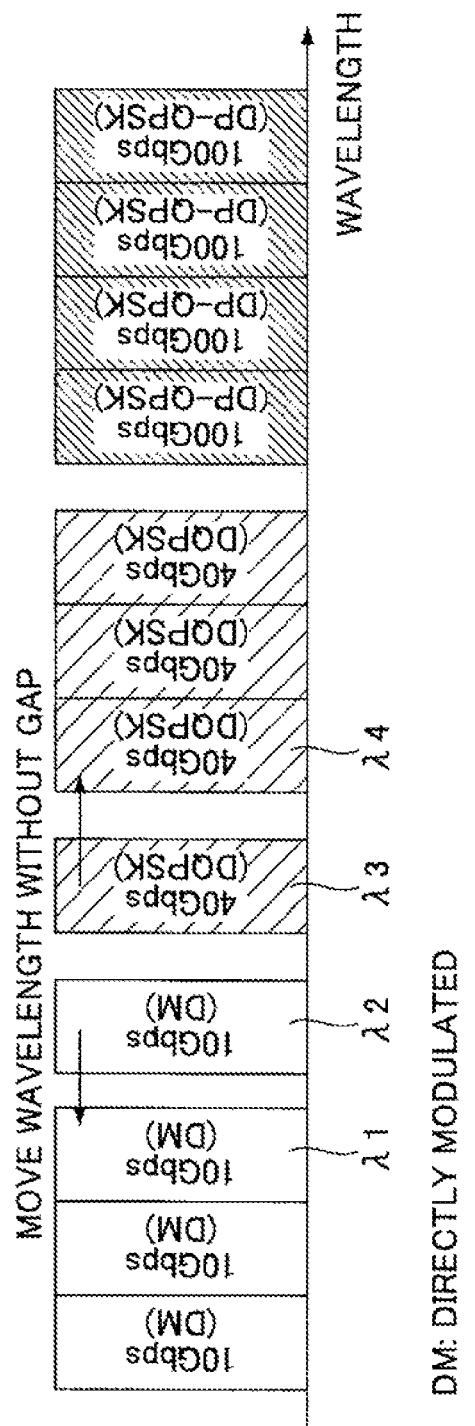
FIG. 13 is a diagram illustrating wavelength allocation for explaining change in a signal wavelength during in-service.

When the wavelength of the optical signal is changed in step S14 of the wavelength reallocation process, or a new signal bandwidth is created by filling a gap between the wavelengths that is formed due to the change in the bit rate of the optical signal in the constructed network, the signal wavelength may be preferably switched without causing instantaneous interruption. FIG. 13 illustrates wavelength allocation in which a wavelength $\lambda 2$ of a directly modulated signal (CH3) with a bit rate of 10 Gbps is allocated via a bandwidth gap from a wavelength $\lambda 1$ of a directly modulated signal (CH1) with a bit rate of 10 Gbps, a wavelength $\lambda 3$ of the DQPSK modulated signal (CH2) with a bit rate of 40 Gbps is allocated via a bandwidth gap from to the wavelength $\lambda 2$, and a wavelength $\lambda 4$ of a DQPSK modulated signal (CH4) with a bit rate of 40 Gbps is allocated via a bandwidth gap from the wavelength $\lambda 3$. In this case, the wavelength $\lambda 2$ is shifted adjacent to the wavelength $\lambda 1$ and the wavelength $\lambda 3$ is shifted adjacent to the wavelength $\lambda 4$, and hence, a large gap bandwidth may be provided between the wavelength $\lambda 2$ and the wavelength $\lambda 3$. A new signal bandwidth may be created in this manner.

In this case, a configuration, in which the wavelength is switched or shifted while suppressing the instantaneous interruption or deterioration in the optical signal of the switching wavelength or adjacent wavelength from occurring, is described.

[Settings-Following Mode]

In FIG. 11, the NMS 1 includes aggregation of wavelength allocation information and path settings information in the network illustrated in FIG. 4. The NMS 1 sets the moving shifting destination wavelength obtained after being switched corresponding to the optical signal having the wavelength subject to switching in each of the nodes between which an optical path is passed through. In the receiving node, the management complex (MC) 70 may, for example, send a report containing the currently set wavelength and the amount of wavelength to be changed to the transponder 64d, the wavelength selective switches (WSS) 66 and 68 and the wavelength selective switch (WSS) 44 of the demultiplexing part 42-8. Based on the report, the central wavelength or the bandwidth is shifted (shifted) in a switched wavelength direction (e.g., shifted by 1 GHz) such that penalty due to optical signal deterioration or based on the number of FEC error corrections will not occur. The information on the shifted (switched) signal wavelength is supplied from the management complex (MC) 70 to the OSC transmitter-receiver part 71-8 and the OSC transmitter-receiver part 71-8 sends the information on the shifted signal wavelength to the downstream node by inserting the information into the OSC signal.

In the downstream node, the central wavelength or the bandwidth may be shifted based on the signal wavelength information of the OSC signal received from the upstream node. The management complex (MC) 70 sends a report containing the currently set wavelength and the amount of wavelength to be changed such that the central wavelength or the bandwidth may be shifted based on the received currently set wavelength and the amount of wavelength in the received report.

Further, a bit rate variable transmitter receiver-device is utilized as a transponder. Thus, when the bit rate of the signal is changed, the NMS 1 or the management complex (MC) 70 sends a report containing the bit rate of the signal to the downstream node so as to change the bandwidth of the corresponding wavelength selective switch (WSS).

[Automatic-Following Mode]

In FIG. 12, the NMS 1 includes aggregation of wavelength allocation information and path setting information in the network illustrated in FIG. 4. The NMS 1 sets the shifting destination wavelength obtained after being switched corresponding to the optical signal having the wavelength subject to switching in each of the nodes between which an optical path is passed through. In the transmitting node, the management complex (MC) 70 may, for example, send a report containing the currently set wavelength and the amount of wavelength to be changed to the transponder 64d, the wavelength selective switches (WSS) 66 and 68 and the wavelength selective switch (WSS) 44 of the demultiplexing part 42-8. Based on the report, the central wavelength or the bandwidth monitored by a corresponding one of the OCMs 72, 73 and 74 is shifted in a switched wavelength direction while the central wavelength is being monitored.

In the downstream node, the central wavelength or the bandwidth may be shifted based on the information on the central wavelength of the optical signal monitored by OCMs 75 and 76. The management complex (MC) 70 may, for example, send to the wavelength selective switches (WSS) 47, 51 and the transponder 53a a report containing the currently set wavelength and the amount of wavelength to be changed such that the central wavelength or the bandwidth may be shifted based on the currently set wavelength and the amount of wavelength to be changed in the received report.

Further, a bit rate variable transmitter receiver-device is utilized as a transponder. Thus, when the bit rate of the signal is changed, each of the OCMs 72 to 76 monitors a bandwidth of a spectrum of the corresponding wavelength and the management complex (MC) 70 automatically change the bandwidth of the corresponding wavelength selective switch (WSS).

[Alarm and Monitoring System]

If there is a possibility to increase the bit rates in the future, the NMS 1 sends to each of the nodes a report indicating that the bandwidths need to be acquired corresponding to increased amounts of the bit rates as guard bands by utilizing the OSC signal. If the wavelength contained in the guard band has been attempted to be utilized in any of the nodes within the network, an alarm is generated from the node that has detected such an attempt to the NMS 1.

Further, if the shifting destination wavelength (i.e., the wavelength to which the wavelength subject to change is shifted or shifted) has been already utilized in another optical path in the receiving node including the wavelength subject to change, the optical signals may collide. Thus, information on the shifting destination wavelength may be sent to the entire network in advance. If there is any interval already utilizing the shifting destination wavelength, an alarm is generated. Note that the alarm may be generated by the NMS 1.

Further, the management complex (MC) 70 of each of the nodes monitors deterioration in the shifting destination wavelength or deterioration in the wavelength adjacent to the shifting destination wavelength (or the number of FEC error corrections). If deterioration in the shifting destination wavelength or deterioration in the wavelength adjacent to the shifting destination wavelength (or the number of FEC error corrections) exceeds a predetermined threshold to elicit an alarm, the management complex (MC) 70 deactivates a wavelength switching operation.

[Wavelength Switching by Stepping Over Existing Signal]

Figure 14:
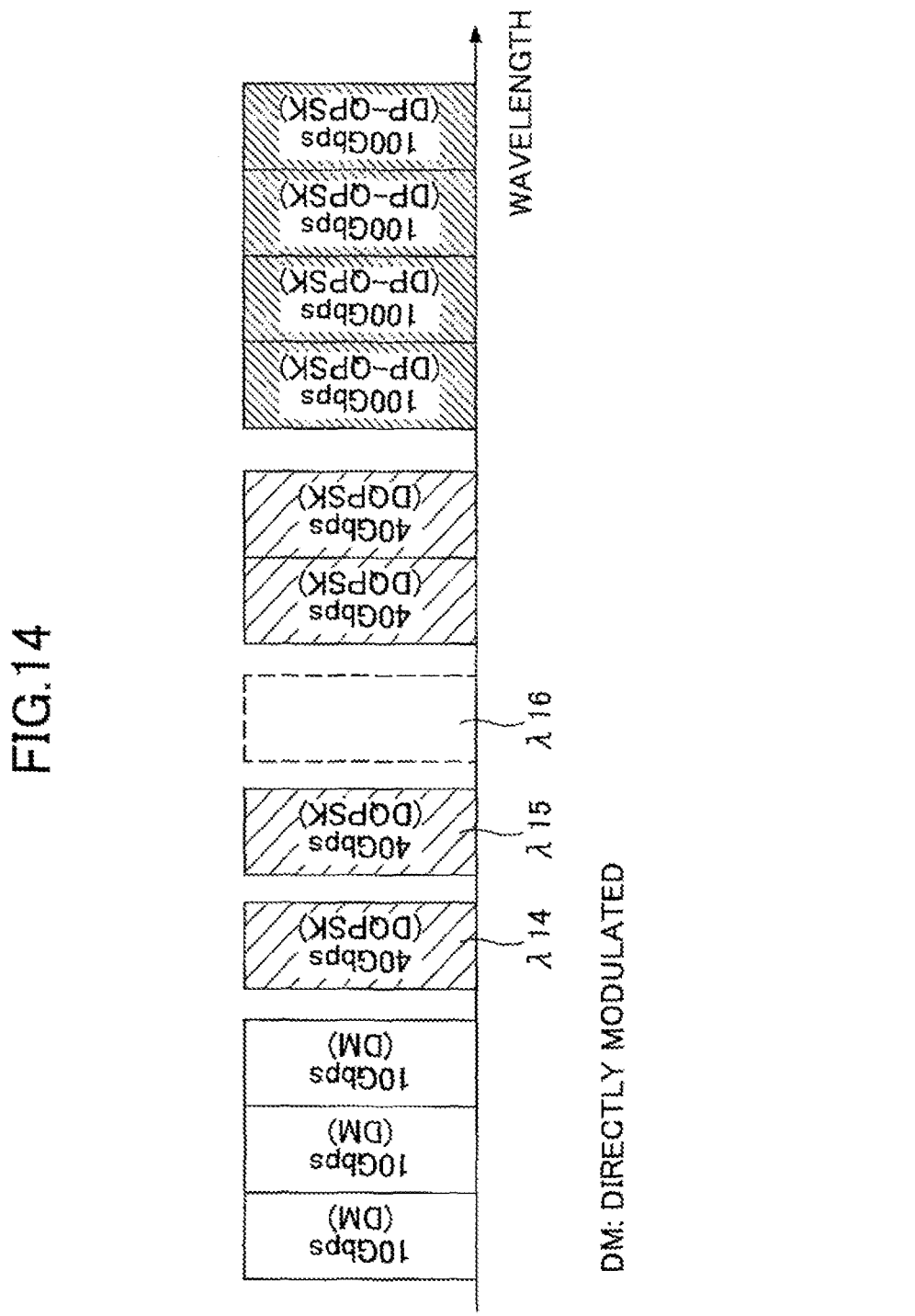
FIG. 14 is a diagram illustrating wavelength allocation in a wavelength division multiplexer (WDM) system.

FIG. 14 illustrates wavelength allocation in which the wavelength λ14 is switched to the wavelength λ16 by allowing the existing signal wavelength λ15 to be stepped (passed) over.

Figure 15:
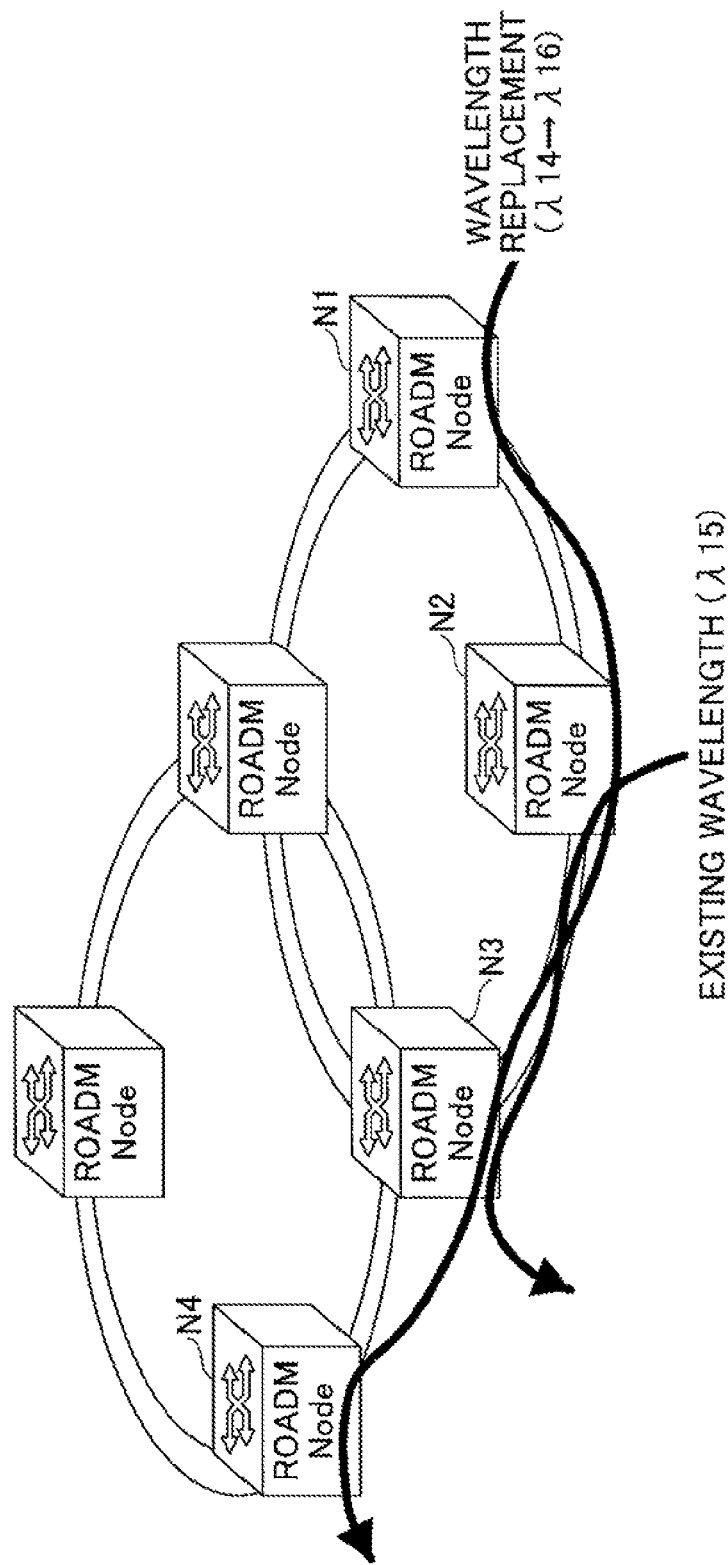
FIG. 15 is a configuration diagram illustrating an optical wavelength multiplexer transmission system.

For example, in the network illustrated in FIG. 15, the existing signal (with the wavelength λ15) utilizes an optical path passing from the node N2 via the node N3 to reach the node N4. The wavelength λ14 utilizes an optical path passing from the node N1 via the nodes N2 and N3 to reach the node N4. In these cases, if the instantaneous interruption of the optical signal (within 50 ms) is allowed, the wavelength reallocation process illustrated in FIG. 10 is utilized. Further, in addition to the wavelength reallocation process illustrated in FIG. 10, the wavelength may be switched in a sufficiently shorter period of time than the wavelength switching rates of the optical transmitter-receiver device (NBO) by preparing only one replacement optical transmitter-receiver device (NBO) for each of the nodes by the following process. Note that in this embodiment, the node device having the switched fabric 23 may be required.

FIG. 16 is a flowchart illustrating a wavelength reallocation process according to another embodiment. As illustrated in FIG. 16, in step S31, a path to the receiving end node N4 (i.e., a path N2-N3-N4) is set by utilizing the switched wavelength λ16 in the node N2 where the wavelength λ14 collides with the wavelength λ15 when the wavelength λ14 is switched to the wavelength λ16.

In step S32, a route for the wavelength λ14 may, for example, be switched from a route in which the optical signal is supplied from the splitter (SPL) 13 of the demultiplexing part 12-1 to the wavelength selective switch (WSS) 14 of the demultiplexing part 12-8 to a route in which the optical signal is supplied from the splitter (SPL) 13 of the demultiplexing part 12-1 via the wavelength selective switches (WSS) 16 and 17 to the optical transmitter-receiver device (NBO) 21*b* in the node N2 having the wavelength collision. Further, the optical transmitter-receiver device (NBO) 21*b* may convert the optical signal having the wavelength λ14 into the electric signal, which is supplied to the switched fabric 23. The switched fabric 23 may then supply the electric signal to the optical transmitter-receiver device (NBO) 22*d* that generates an optical signal having the wavelength λ16. Accordingly, the optical signal having the wavelength λ14 is converted into the optical signal having the wavelength λ16, and the converted optical signal having the wavelength λ16 is passed through the wavelength selective switches (WSS) 33 and 14. Thereafter, the converted optical signal having the wavelength λ16 is sent through the switched path set in step S31. At this moment, an instantaneous interruption of 50 ms or less may occur.

In step S33, the optical signal having the wavelength λ14 is switched to the optical signal having the wavelength λ16 in the transmitting node N1. In this case, the optical signal having the wavelength λ14 in the nodes N2, N3 and N4 is switched to the optical signal having the wavelength λ16 by utilizing the aforementioned settings-following mode or the automatic following mode.

In step S34, in the node N2 having the wavelength collision, a route for the optical signal of the wavelength 216 may, for example, be switched to a route in which the optical signal is supplied from the splitter splitter (SPL) 13 of the demultiplexing part 12-1 to the wavelength selective switch (WSS) 14 of the demultiplexing part 12-8 and the wavelength selective switch (WSS) 14 outputs the optical signal by selecting the optical signal supplied from the splitter (SPL) 13 of the demultiplexing part 12-1. At this moment, an instantaneous interruption of 50 ms or less may occur.

As described above, with the above embodiments and modifications, transmission degradation due to the cross-phase modulation (XPM) may be prevented when various bit rates and modulation systems are utilized. Further, the bandwidth of the WDM signal may be effectively utilized and the network may be flexibly designed by changing a wavelength during in-service without causing instantaneous interruption of the optical signal. Further, the number of components required for wavelength change may be reduced to minimum and duration required for the wavelength change may become shorter.

According to embodiments and modifications, the instantaneous interruption time in the wavelength reallocation of the optical signal may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. A method for reallocating a wavelength in an optical wavelength multiplexer transmission system, the method comprising:
    switching a supply of a first channel electric signal from a first optical transmitter device to a second optical transmitter device, the first optical transmitter device converting the first channel electric signal into an optical signal of a first wavelength, and the second optical transmitter device converting the first channel electric signal into an optical signal of a second wavelength differing from the first wavelength;
    transmitting the optical signal of the second wavelength output from the second optical transmitter device;
    gradually shifting, based on a second channel electric signal, a wavelength of an optical signal output from a third optical transmitter device from a third wavelength toward the first wavelength;
    transmitting the optical signal having the first wavelength;
    setting the first optical transmitter device to transmit the optical signal of the third wavelength;
    switching the supply of the first channel electric signal from the second optical transmitter device to the first optical transmitter device utilizing electric signal switching; and
    transmitting the optical signal of the third wavelength output from the first optical transmitter device.

2. The method as claimed in claim 1, further comprising:
    switching a supply of the second channel electric signal from the third optical transmitter device to a fourth optical transmitter device, the third optical transmitter device converting the second channel electric signal into an optical signal of a fourth wavelength differing from one of the first wavelength, the second wavelength and the third wavelength; and
    transmitting the optical signal of the fourth wavelength output from the fourth optical transmitter device.

3. The method as claimed in claim 2, further comprising:
    setting the first optical transmitter device to transmit the optical signal of the third wavelength and setting the third optical transmitter device to transmit the optical signal of the first wavelength;
    switching the supply of the first channel electric signal from the second optical transmitter device to the first optical transmitter device utilizing electric signal switching and switching the supply of the second electric signal from the fourth optical transmitter device to the third optical transmitter device utilizing electric signal switching; and
    transmitting the optical signal of the third wavelength output from the first optical transmitter device and transmitting the optical signal of the first wavelength output from the third optical transmitter device.

4. A method for reallocating a wavelength in an optical wavelength multiplexer transmission system that includes first, second, third, and fourth nodes, and a network mutually connecting the first to fourth nodes, an optical signal of a first wavelength being transmitted between the first node and the fourth node through the second node and the third node, another optical signal of another wavelength being transmitted between the second node and the third node, the method converting the optical signal of the first wavelength into an optical signal of a second wavelength, which is different from the first wavelength and the another wavelength, the method comprising:
    preparing, in the second node, a first optical receiver device configured to receive the optical signal of the first wavelength through the network and convert the optical signal of the first wavelength into a first channel electric signal and a first optical transmitter device configured to convert the first channel electric signal into the optical signal of the second wavelength, and preparing a path for the optical signal of the second wavelength between the second node and the fourth node through the third node;

switching, in the second node, a supply of the optical signal of the first wavelength received from the network to the first optical receiver device utilizing a wavelength selective switch;

switching, in the second node, a supply of the first channel electric signal converted by the first optical receiver device to the first optical transmitter device utilizing an electric signal switch;

transmitting, in the second node, the optical signal of the second wavelength output by the first optical transmitter device to the network;

causing, by a second optical transmitter device included in the first node, the optical signal of the first wavelength to be switched to the optical signal of the second wavelength; and switching, in the second node, a supply of the optical signal of the second wavelength received from the first node through the network utilizing another wavelength selective switch to an optical through path that does not pass through the electric signal switch and directly transmits the optical signal of the second wavelength to the third node through the network.

5. A node for use in an optical wavelength multiplexer transmission system, the node comprising:

a first optical transmitter device configured to convert a first channel electric signal into an optical signal of a first wavelength;

a second optical transmitter device configured to convert the first channel electric signal into an optical signal of a second wavelength differing from the first wavelength;

an electric signal switching part configured to switch a supply of the first channel electric signal from the first optical transmitter device to the second optical transmitter device;

a transmitting part configured to transmit one of the optical signal of the first wavelength output from the first optical transmitter and the optical signal of the second wavelength output from the second optical transmitter; and a third optical transmitter device configured to convert a second channel electric signal into an optical signal of a predetermined wavelength to output the converted optical signal having the predetermined wavelength, the third optical transmitter device being a wavelength variable element, wherein the predetermined wavelength of the optical signal output from the third optical transmitter device is gradually shifted from a third wavelength toward the first wavelength to form the optical signal having the first wavelength, wherein the first optical transmitter device is a wavelength variable element set to output the optical signal of the third wavelength, wherein the electric signal switching part electrically switches the supply of the first channel electric signal from the second optical transmitter device to the first optical transmitter device, and wherein the transmitting part transmits the optical signal of the third wavelength output from the first optical transmitter device.

6. The node device as claimed in claim 5, further comprising:

the third optical transmitter device configured to convert the second channel electric signal into an optical signal of the third wavelength; and a fourth optical transmitter device configured to convert the second channel electric signal into an optical signal of a fourth wavelength differing from one of the first wavelength, the second wavelength and the third wavelength, wherein the electric signal switching part switches a supply of the second channel electric signal from the third optical transmitter device to the fourth optical transmitter device, and the transmitting part transmits the optical signal of the fourth wavelength output from the fourth optical transmitter device.

7. The node device as claimed in claim 6, wherein the first optical transmitter device and the third optical transmitter device are wavelength variable elements such that the first optical transmitter device is set to output the optical signal of the third wavelength and the third optical transmitter device is set to output the optical signal of the first wavelength, the electric signal switching part switches the supply of the first channel electric signal from the second optical transmitter device to the first optical transmitter device and switches the supply of the second electric signal from the fourth optical transmitter device to the third optical transmitter device, and the transmitting part transmits the optical signal of the third wavelength output from the first optical transmitter device and transmits the optical signal of the first wavelength output from the third optical transmitter device.

* * * * *